United States Patent [19]

Lee et al.

[11] Patent Number: 4,668,738

[45] Date of Patent: May 26, 1987

[54] PROCESS FOR PROMOTING SYNERESIS IN HIGH RUBBER ABS LATEX

[75] Inventors: John W. Lee; Eugene R. Moore, both of Midland, Mich.

[73] Assignee: The Dow Chemical Company, Midland, Mich.

[21] Appl. No.: 813,316

[22] Filed: Dec. 24, 1985

[51] Int. Cl.$^4$ .............................................. C08L 55/02
[52] U.S. Cl. ..................................... 525/83; 523/326; 523/335; 525/84; 525/85; 525/197; 525/198
[58] Field of Search ................. 523/326, 335; 525/83, 525/84, 85, 197, 198; 528/500

[56] References Cited

U.S. PATENT DOCUMENTS

| | | | |
|---|---|---|---|
| 3,375,302 | 3/1968 | Iwai et al. | 525/316 |
| 3,442,979 | 5/1969 | Ott et al. | 525/316 |
| 4,299,952 | 11/1981 | Pingel et al. | 525/500 |

*Primary Examiner*—Jacob Ziegler
*Attorney, Agent, or Firm*—Harness, Dickey and Pierce

[57] ABSTRACT

A process, and the well-dispersed product thereof, for recovering solids from a latex of a grafted rubber concentrate having a rubber substrate and a glassy superstrate by: (a) adding a latex of said superstrate to said grafted rubber concentrate latex; (b) coagulating said latex with high shear to form a paste; (c) heating said paste to cause syneresis of said paste into polymeric particles; and (d) dewatering said particles.

14 Claims, 2 Drawing Figures

PROCESS FOR PROMOTING SYNERESIS IN HIGH RUBBER ABS LATEX

BACKGROUND OF THE INVENTION

The present invention relates to the recovery of solid rubber-modified polymer particles from high rubber latexes. More particularly, the present invention relates to a process for promoting large particle formation and syneresis in acrylonitrile-butadiene-styrene resin (ABS) production and to the product thereby produced.

Rubber-modified polymers are conventionally made by preparing a rubber latex by emulsion polymerization and then polymerizing matrix monomers in the presence of the rubber latex. The latex solids are then recovered from the latex for subsequent compounding and use. One method for recovering latex solids is taught in U.S. Pat. No. 4,299,952, Nov. 10, 1981 to Pingel, et al. The Pingel, et al. patent teaches a shear coagulation process wherein a latex is shear coagulated to form a paste, which is then subjected to finishing steps of heating and shearing to form a crumb which is mechanically dewatered and ground to a desired particle size.

It has been found, however, that some latex solids are unfinishable due to their inability to synerese and form hard distinct particles that can be mechanically dewatered. ABS solids of high rubber content, i.e., of greater than about 50% rubber, give rise to such finishing problems. The process of the present invention provides a method by which previously unfinishable latexes can be finished and consequently also a method by which a wide range of latexes including ABS resins of high rubber content can be made by an emulsion polymerization—shear coagulation process. Surprisingly, not only does the present method facilitate finishing of high rubber latexes, the product of the method has improved gloss, elongation and impact strength. These and still other advantages of the present invention will be apparent from the following description taken in conjunction with the drawings and claims. All percentages and parts herein are by weight unless otherwise indicated.

SUMMARY OF THE INVENTION

Figure 1:
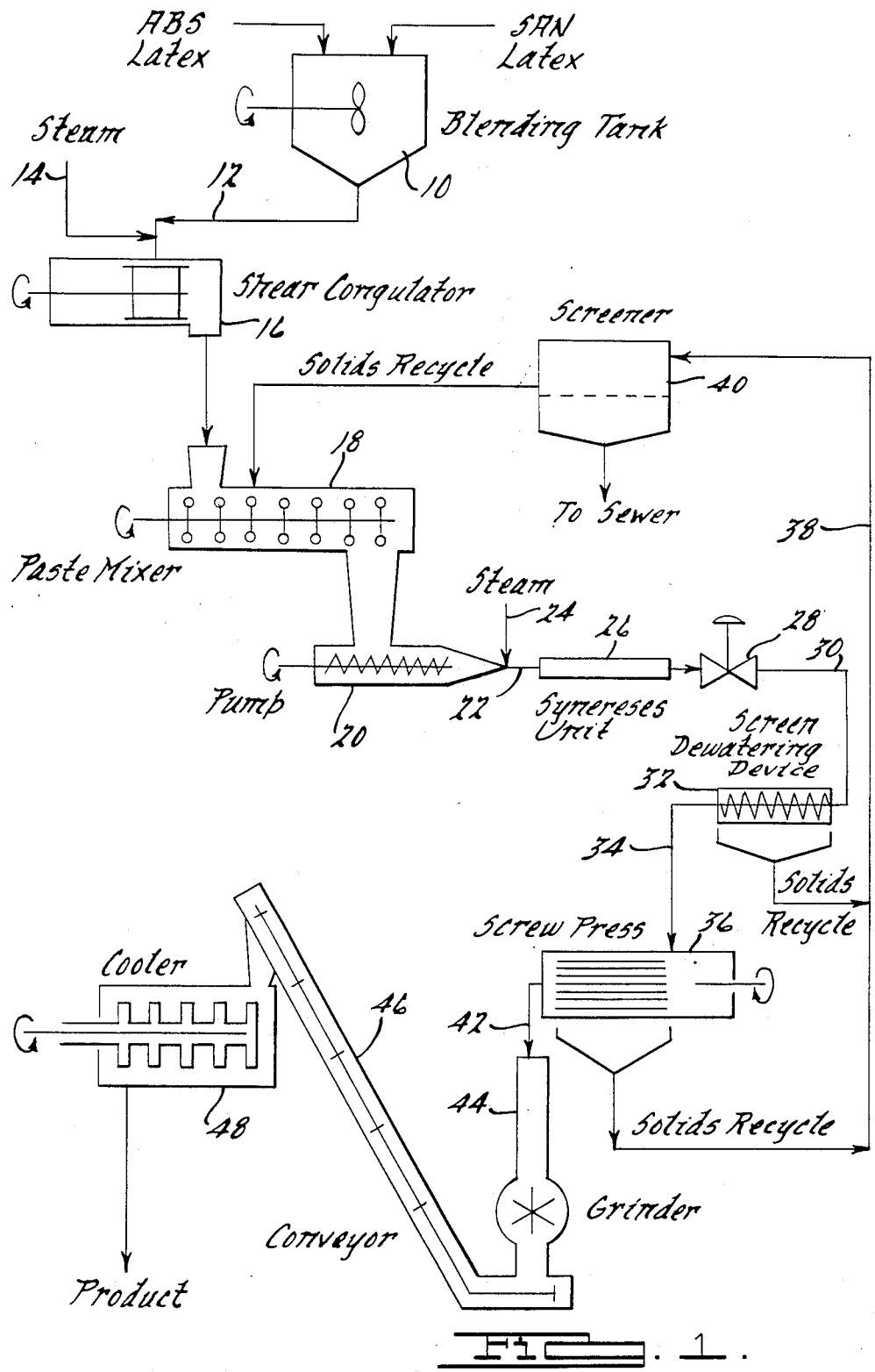
FIG. 1 is a schematic diagram illustrating a preferred process of the present invention.

In accordance with the present invention, solids are recovered from a latex of a grafted rubber latex having a rubber substrate and a glassy superstrate by: (a) adding a latex of a superstrate to said grafted rubber latex; (b) coagulating said latex with high shear to form a paste; (c) heating said paste to cause syneresis of said paste into polymeric particles; and (d) dewatering said particles. Preferably the latex of grafted rubber is an unfinishable high rubber latex and the latex of said superstrate is added in an amount sufficient to allow finishing of said latex in a shear coagulation, syneresis, mechanical dewatering process. Also, preferably the substrate contains a diene moiety and the superstrate is an interpolymer comprising a monovinylidene aromatic hydrocarbon and an ethylenically unsaturated nitrile.

DESCRIPTION OF THE INVENTION

In accordance with the present invention, a process is provided for recovering solid, grafted rubber particles from grafted rubber latex in a shear coagulation, mechanical dewatering process. Preferably, the grafted rubber latex is an "unfinishable high rubber latex", i.e. a latex of greater than about 50% rubber content. Previously such high rubber latexes were considered "unfinishable" because they were characterized by an inability to synerese and form hard distinct particles that could be mechanically dewatered by, for example, a screw press. By the term "syneresis" is meant the conversion of loosely bound shear coagulated paste into a dense hard crumb which will not disintegrate during screw press dewatering, thus converting an unfinishable nonuseful product to a finishable, useful product. It has now been found that such high rubber latexes having a rubber substrate and a glassy superstrate can be made finishable by the addition of an effective amount of the superstrate latex prior to shear coagulating the latexes.

The mixture of latexes is then recovered in a finishing process of shear coagulation, followed by syneresis and mechanical dewatering. The amount of shear is that amount effective to obtain shear coagulation. Preferably, the present process is employed in conjunction with the finishing process disclosed in U.S. Pat. No. 4,299,952, Nov. 10, 1981 to Pingel, et al., the disclosure of which is specifically incorporated by reference herein.

Surprisingly, the product of this process is easier to manufacture and has improved product characteristics. For example, not only does the process of this invention allow finishing of high rubber content latexes with attendant high productivity, but the process obtains a product which is easily compounded to be molded or extruded to a final product having excellent gloss, elongation and IZOD impact strength characteristics. Furthermore, the process of this invention obtains a well dispersed two phase system with less expenditure of energy than would be required by a relatively high energy non-aqueous compounding process. Still further, the process offers a productivity advantage in providing a high rubber, low graft product with minimal reactor time in a relatively clean polymerization process.

FIG. 1 shows a schematic diagram of a preferred embodiment of the process of this invention. An acrylonitrile-butadiene-styrene latex of high rubber content is blended with a styrene-acrylonitrile latex in blending tank 10. The mixed latexes flow through conduit 12 and are injected with steam by steam supply conduit 14 to raise the latex mixture temperature to a desirable coagulating temperature, for example, 40°–90° C., whereupon the mixture flows into shear coagulator 16. Shear coagulator 16 is a conventional high shear coagulation means which discharges a paste-like mass into paste mixer 18 which has a plurality of angled blades affixed to a rotating shaft and which mixes and forwards the paste-like mass to a screw type pump 20. Pump 20 further mixes and then discharges the paste-like mass into conduit 22, where steam supply conduit 24 injects steam therein and the steam injected paste-like mass flows into synerese unit 26 wherein syneresis occurs to form a slurry of latex polymer crumb of discrete, hardened ABS particles.

Valve 28 opens and closes to maintain pressure in syneresis unit 26 which essentially is a heated pipe holding the paste-like mass under pressure to allow syneresis to occur. When open, valve 28 allows flow of ABS crumb and water through conduit 30 to screen dewatering device 32 which provides for initial mechanical dewatering of the ABS crumb. Next, the crumb and residual water flow through conduit 34 into a conventional screw press 36 where further dewatering of the crumb occurs. Fine solids from screen dewatering device 32 and screw press 36 are recycled through conduit 38 to screener 40 and into paste mixer 18. ABS crumb from screw press 36 flows through conduit 42 into grinder 44 where the crumb is comminuted and then conveyed by conveyor 46 to cooler 48 to provide a final product ready for further compounding, injection molding or other conventional processing. It will be appreciated that the above finishing process is substantially that of the above-referenced Pingle U.S. Pat. No. 4,299,952 with the exception of the improvement of the present invention in mixing latexes in tank 10.

Figure 2:
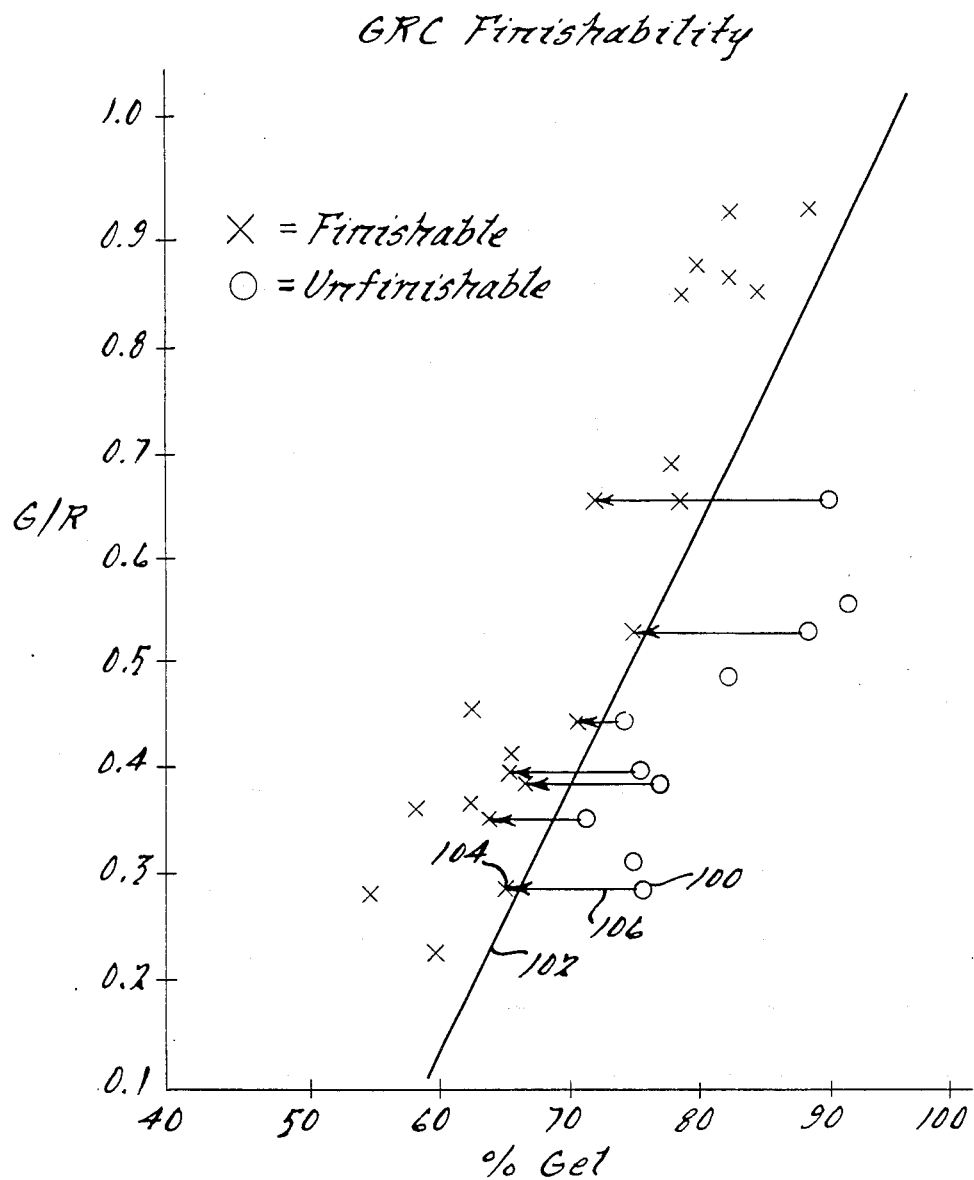
FIG. 2 is a graph illustrating the relationship between graft ratio, gel level and finishability.

Now referring to FIG. 2, the relationship between G/R (graft to rubber) ratio, percent gel and finishability is shown. The arrows indicate the decrease in percent gel when emulsion styrene-acrylonitrile-copolymer (SAN) is added to graft rubber (GRC) latex. The diagonal line 102 in FIG. 2 divides finishable and unfinishable latexes. As can be seen from FIG. 2, addition of emulsion SAN, for example, to sample 100, changes the percent gel leftward to point 104 as indicated by arrow 106 from an unfinishable point to a finishable point. Percent gel is determined by soaking the sample in a good solvent for the rigid phase such as methyl ethyl ketone (MEK) or tetrahydrofuran until all of the rigid phase is dissolved. The dissolved gel is then removed by filtration and washed with fresh solvent, and then dried to remove all traces of solvent. The residual gel is believed to be composed of cross linked rubber and rigid phase (SAN) which has been grafted to the cross linked rubber.

The process of this invention is broadly applicable to any grafted rubber latex. Generally speaking, such grafted rubber latexes are well known in the art as are various methods for their making. The latexes can be produced by polymerizing rubber or elastomeric core (substrate) and grafting a thin outer layer of rigid phase polymer thereon (superstrate). For example, the process is useful with compositions having a superstrate component which is an interpolymer comprising a monovinyl aromatic hydrocarbon or monovinyl aromatic hydrocarbon and an ethylenically unsaturated nitrile grafted to a substrate component which comprises a diene moiety. Preferred latexes of the present invention are styrene-acrylonitrile-rubber latexes wherein styrene-acrylonitrile copolymer is grafted to a diene rubber substrate such as polybutadiene, or interpolymers of butadiene and styrene or of butadiene and styrene and acrylonitrile.

Suitable rubber core onto which the interpolymer can be grafted include conjugated 1,3-diene rubbers, ethylene-propylene-diene terpolymer rubbers, acrylate-diene interpolymer rubbers and mixtures thereof. Preferably, the elastomeric cores are polymerized from a monovinylidene aromatic monomer, a conjugated diolefin, and an ethylenically unsaturated nitrile monomer, hereinafter "first generally hydrophobic monomer mixture".

The term "monovinylidene aromatic monomer" is intended to include those monomers wherein a radical of the formula

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene; alpha-methylstyrene; ortho-, meta-, and para-ethylstyrene; o,p-dimethylstyrene; o,p-diethylstyrene; isopropylstyrene; o-methyl-p-isopropylstyrene; p-chlorostyrene; p-bromostyrene; o,p-dichlorostyrene; o,p-dibromostyrene; vinylnapthalene; diverse vinyl(alkylnaphthalenes); and vinyl(-halonaphthalenes); and comonomeric mixtures thereof.

Because of considerations such as cost, availability, ease of use, etc., styrene is the preferred monovinylidene aromatic monomer. The monovinylidene aromatic monomer constitutes from about 0 to about 40, preferably from about 0 to about 15 weight percent of the first generally hydrophobic monomer mixtures.

The term "conjugated diolefin" is meant to include 1,3-butadiene; 2-methyl-1,3-butadiene; 1,3-dimethyl-1,3-butadiene; pentadiene; 2-neopentyl-1,3-butadiene; and other hydrocarbon analogs of 1,3-butadiene; and, in addition, the substituted 1,3-butadienes, such as 2-chloro-1,3-butadiene; 2-cyano-1,3-butadiene the substituted straight chain conjugated pentadienes; the straight chain and branch chain conjugated hexadienes; other straight and branched chain conjugated dienes having from about 4 to about 9 carbon atoms, and comonomeric mixtures thereof.

The cost, ready availability, and excellent properties of interpolymers produced therefrom, makes 1,3-butadiene the most preferred conjugated diolefin for use in the present invention. The conjugated diolefin constitutes from about 50 to about 100, preferably, from about 70 to about 100, and most preferably from about 85 to about 96 weight percent of the first generally hydrophobic monomer mixture.

The term "ethylenically unsaturated nitrile monomer" is meant to include, acrylonitrile, methacrylonitrile, ethacrylonitrile and the like, and mixtures thereof. The ethylenically unsaturated nitrile monomer is present in an amount of from about 0 to about 15 weight percent, preferably from about 0 to about 5 weight percent of the first generally hydrophobic monomer mixtures. The cost, and ready availability, make acrylonitrile the most preferred ethylenically unsaturated nitrile monomer for use in the present invention.

The graftable rubber substrate is prepared by continuing polymerization of the monomers present in the aqueous suspension of the partially polymerized monomers until achieving a conversion of monomer to polymer of at least 50%. The unreacted monomers, optionally, may be removed from the aqueous suspension of partially polymerized monomers prior to the graft polymerization step by any of the conventional monomer removal methods.

This method of forming the graftable rubber substrate is preferred because it is quick and efficient and produces a graftable rubber substrate capable of having grafted thereto a substantially continuous, generally uniform layer of superstrate. It is understood that any method of forming a graftable rubber substrate capable of having grafted thereto a substantially continuous, generally uniform layer of superstrate is suitable for use in the present invention.

Additionally, while less desirable compositions could be expected to result, it should be possible to utilize any method of forming the graftable rubber substrate. This is true even if the superstrate grafted thereto does not form a substantially continuous, generally uniform layer.

The graftable rubber substrates preferably have diameters ranging in size from about 300 to about 5,000, preferably from about 800 to about 2,000 Å; the foregoing values being number average values.

The graftable rubber substrates are then subjected to a graft polymerization step wherein a substantially continuous superstrate of an interpolymer is grafted to the graftable rubber substrate. The interpolymer graft to the graftable rubber substrate is polymerized from a monomer mixture comprising a monovinylidene aromatic monomer and one or more monomers copolymerizable therewith.

The monovinylidene aromatic monomers suitable for graft polymerization to the graftable rubber substrates are the same as those hereinbefore described as being suitable for inclusion in the first generally hydrophobic monomer mixture. The monomers copolymerizable with the monovinylidene aromatic monomers include the ethylenically unsaturated nitrile monomers and the monoethylenically unsaturated esters of carboxylic acid monomers.

Exemplary of the ethylenically unsaturated nitrile monomers suitable for copolymerization with the monovinylidene aromatic monomers are the ethylenically unsaturated nitrile monomers hereinbefore described as being suitable for inclusion in the first generally hydrophobic monomer mixture. The preferred ethylenically unsaturated nitrile monomer is acrylonitrile.

Exemplary of the ethylenically unsaturated esters of carboxylic acid monomers suitable for copolymerization with the monovinylidene aromatic monomers are methylacrylate, methyl methacrylate, ethylacrylate, ethyl methacrylate, 2-chloroethyl methacrylate, propyl acrylate or methacrylate, n-butyl acrylate or methacrylate, 2-ethyl hexyl acrylate, and the like. For reasons of cost and ease of use of the preferred ethylenically unsaturated carboxylic acid monomer is methyl methacrylate.

The graftable rubber substrates are grafted with the interpolymer by techniques well known in the art. Preferred are techniques which favor the formation of a rigid thermoplastic polymer shell around the graftable rubber substrates rather than discrete particles of interpolymer separate from the graftable rubber substrates. Typically, the monomers from which the interpolymer is polymerized are polymerized in the presence of an emulsion of the graftable rubber substrates.

In accordance with the present invention, once having obtained a grafted rubber latex, a latex of the superstrate polymer is added to the grafted rubber latex. Of course, preferably, the grafted rubber latex is an "unfinishable high rubber latex", i.e. a latex of greater than about 50% rubber content.

The exact amount of latex of superstrate polymer to be added to the grafted rubber latex will vary with the specific make-up of the latex as well as the process steps and conditions of the finishing process. The amount of emulsion superstrate to be added will be an amount effective to obtain a finishable latex under the finishing process conditions in use. The emulsion superstrate preferably has a particle size less than 5000 Å (volume mean diameter), more preferably less than about 3000 Å, and even more preferably less than 2000 Å. It is believed that continued improved performance will be found as size decreases until the 200–500 Å range where performance will decrease. The grafted rubber latex and superstrate polymer latex are thoroughly mixed before shear coagulation. Such mixing insures a thorough dispersion of polymers and can be carried out with low energy use while the polymers are in latex form.

Further understanding of the present invention can be had from the following examples.

EXAMPLES 1–7

Preparation of SAN Latex

For each of Examples 1–7, styrene-acrylonitrile copolymer latex is prepared in accordance with the following procedure. A clean 200 gallon reactor is used. To this reactor is added 726 pounds of deionized water and 7.02 pounds of a 43% solid soap solution (Calsoft L40). The reactor is agitated at 100 rpm and heated to 70° C. When reaction temperature is reached, two continuous addition streams are initiated. The first stream contains:

styrene monomer: 435.6 lbs.
normal octyl mercaptan: 2.7 lbs.
acrylonitrile: 169.4 lbs.

The first stream is added to the reactor at a rate of 121.5 pounds per hour. The second stream contains:

deionized water: 211.7 lbs.
43% solids (Calsoft L40) soap solution: 21.1 lbs.
sodium persulfate initiator: 0.605 lbs.

The second stream is added at a rate of 46.7 pounds per hour for 5 hours. After the two streams are completely added, the reactor is held at temperature for an additional hour. Then a separate addition made of the following:

deionized water: 24.2 lbs.
10% solution of ethylenediamine-tetraacetic acid sold under the tradename Versene 100: 0.387 lbs.
silicone antifoam agent with 10% active material sold by Dow Corning as Antifoam H-10: 1.2 lbs.

The latex is steam stripped to remove residual monomer and cooled. The particle size of the latex is measured using hydrodynamic chromatography and the volume mean diameter is found to be 1840 Å.

Preparation of Substrate Rubber

For each of Examples 1–7, a substrate rubber is prepared in accordance with the following procedure. A soap "master batch" is prepared by adding the following ingredients in step-wise fashion:

| Soap Master Batch | Parts by Weight |
|---|---|
| parts deionized water | 365.4 |
| parts sodium oleate | 12.2 |
| parts *Dresinate 214 Solution (75% solids; warmed with steam to reduce viscosity) | 38.0 |
| parts NaOH | 0.352 |

*A product of Hercules which comprises rosin soap (potassium salt of abietic acid).

An initial "aqueous charge" is prepared by mixing:

| | Parts by Weight |
|---|---|
| Aqueous Charge | |
| parts water (deionized) | 54.600 |
| parts sodium persulfate | 0.450 |
| parts sodium bicarbonate | 0.500 |
| parts sodium hydroxide beads | 0.150 |
| parts soap master batch | 5.500 |
| parts versene 100 | 0.064 |

A mixed monomer charge is prepared by mixing:

| Mixed Monomer Charge | |
|---|---|
| parts styrene | 7.00 |
| parts acrylonitrile | 3.00 |
| parts tertiary dodecyl mercaptan | 0.25 |
| parts butadiene | 90.00 |

The initial Aqueous Charge is added to a clean, 200 gallon reactor. Next, the Mixed Monomer Charge is added to the reactor, and agitation (115 rpm) initiated. The reactor is heated to about 65° C. and the pressure brought to about 120 psig. The reaction is allowed to progress for about 10 hours.

At 10 hours, a part of the Soap Master Batch is added as a soap shot.

At 11 hours, the agitator is slowed from 115 to 60 rpm. As the reaction proceeds to consume butadiene, the pressure drops. At 85 psig a constant addition stream containing the following is added over 10 hours.

| Constant Addition Stream | Parts by Weight |
|---|---|
| 10% rosin soap solution | 11.500 |
| deionized water | 147.600 |
| sodium persulfate | 0.120 |

Four hours after initiating addition of the above, the reactor temperature is increased from 65° C. to 80° C. using a 6 hour linear ramp. The reaction continues until the pressure has droped to 50 psig at 80° C. At this point, the following Pregraft Aqueous charge is added.

| Pregraft Aqueous Charge | Parts by Weight |
|---|---|
| soap master batch | 5.000 |
| deionized water | 15.400 |
| sodium persulfate | 0.050 |
| sodium hydroxide beads | 0.025 |

Then a one hour continuous addition stream of the following pregraft monomer is added:

| Pregraft Monomer | Parts by Weight |
|---|---|
| styrene | 3.600 |
| acrylonitrile | 1.400 |
| normal octyl mercaptan | 0.045 |

The reaction continues for 2 hours and then the graft step started as follows (except for Examples 2-7 where butadiene is completely purged before proceeding).

Graft Polymerization

For each of Examples 1-7, a latex of grafted rubber is prepared in accordance with the following procedure. The following compositions are made up in separate tanks.

| | Parts by Weight |
|---|---|
| Initiator Shot | |
| deionized water | 2.920 |
| sodium hydrosulfate | 0.080 |
| sodium hydroxide | 0.090 |
| Grafting Monomer | |
| styrene (72%) | 43.060 |
| acrylonitrile (28%) | 16.740 |
| N—octyl mercaptan (0.902 pph) | 0.544 |
| Aqueous Con Add | |
| deionized water | 94.100 |
| sodium persulfate | 0.400 |
| sodium bicarbonate | 0.300 |
| sodium hydroxide | 0.110 |
| Calsoft L40 (43% solids) | 2.326 |
| Antifoam Shot | |
| Antifoam FG-10 | 0.200 |
| deionized water | 4.000 |

The temperature of the reactor is lowered to 70° C. and the initiator shot is pumped into the reactor which contains the substrate rubber product made as set forth above under "Preparation of Substrate Rubber". Immediately thereafter, both the Aqueous Charge and Mixed Monomer Charge are started and added at a uniform rate over a four hour period. When these additions are complete, a one hour cool-down is allowed. The antifoam shot is added and the latex is transferred to a still for residual monomer removal by steam stripping.

The latex is then transferred to a water cooled vessel and cooled. The cooled latex is then stabilized with an emulsion of:

| | Parts by Weight |
|---|---|
| Calsoft solution (43%) | 0.18 |
| Topanol | 0.33 |
| DLTDP | 1.0 |
| polyguard | 1.0 |
| water | to 15% solids |

Particle size of the latexes are determined by hydrodynamic chromotography. The particles are found to fall into three size ranges. The small particles are 8.3 volume % and have a mean size of 907 Å, units (Å); the medium 85.4% have a 2800 Å volumetric mean while the largest 6.3% have a 9000 Å mean. The overall volumetric mean is 3552 Å.

| Run | Parts Sodium Persulfate in Rubber | Reaction Time to Reach Final 50 psig (hrs) | Parts Grafting Monomer | Total Amount Charged | Final Latex Solids |
|---|---|---|---|---|---|
| ADG 9545 | 0.50 | 29.0 | 67.3 | 517.8 | 30.5 |
| ADG 9549 | 0.50 | 26.0 | 67.3 | 517.1 | 32.9 |
| ADG 9559 | 0.50 | 33.0 | 60.3 | 456.1 | 33.0 |
| ADG 9571 | 0.61 | 31.2 | 106.5 | 502. | 38.0 |
| ADG 9581 | 0.67 | 34.6 | 60.3 | 456.1 | 29.5 |
| ADG 9591 | 0.62 | 31.0 | 60.3 | 456.1 | 27.4 |
| ADG 9593 | 0.62 | 40.5 | 60.3 | 456.1 | 27.5 |

Styrene-acrylonitrile copolymer latex made as set forth above under "Preparation of SAN Latex" is added to a portion of each latex of Runs 1-7 in an amount to lower the percent rubber as indicated below. The mixed latexes are then finished and the resin product recovered using the apparatus and procedures of the above-mentioned U.S. Pat. No. 4,299,952.

| Example | G/R | % Gel | % Rubber | Izod | Gloss | MFR | % Rubber | Finishable |
|---|---|---|---|---|---|---|---|---|
| 1 | | | | | | | | |
| ADG 9545 Latex | 0.65 | 89 | 54 | 4.0 | 89 | 1.1 | 19 | No |
| w/SAN added | 0.65 | 78 | 47 | | | | | Yes |
| w/SAN added | 0.65 | 71 | 43 | | | | | Yes |
| 2 | | | | | | | | |
| ADG 9549 Latex | 0.51 | 87 | 58 | 3.7 | 93 | 1.1 | 19.6 | No |
| w/SAN added | 0.51 | 75 | 49 | 3.8 | 93 | 3.6 | 19.6 | Yes |
| 3 | | | | | | | | |
| ADG 9559 Latex | 0.39 | 75 | 53 | 8.2 | 89 | 1.4 | 26.1 | No |
| w/SAN added | 0.39 | 65 | 47 | 4.3 | 93 | 3.6 | 19.6 | Yes |
| 4 | | | | | | | | |
| ADG 9571 Latex | 0.43 | 74 | 52 | 3.4 | 85 | 4.2 | 21.1 | No |
| w/SAN added | 0.43 | 72 | 50 | 3.7 | 88 | 3.5 | 20.9 | Yes |
| 5 | | | | | | | | |
| ADG 9581 Latex | 0.39 | 77 | 54 | 4.7 | 90 | 4.7 | 22 | No |
| w/SAN added | 0.39 | 65 | 46 | 4.2 | 93 | 5.8 | 21.1 | Yes |
| 6 | | | | | | | | |
| ADG 9591 Latex | 0.35 | 72 | 54 | 4.2 | 87 | 5.2 | 21.2 | No |
| w/SAN added | 0.35 | 64 | 48 | 4.1 | 93 | 5.7 | 20.9 | Yes |
| 7 | | | | | | | | |
| ADG 9593 Latex | 0.28 | 75 | 59 | 4.7 | 85 | 4.6 | 21.5 | No |
| w/SAN added | 0.28 | 64 | 50 | 4.5 | 88 | 5.6 | 21.2 | Yes |

Addition of emulsion SAN results in formation of large hard particles during the syneresis step.

EXAMPLE 8

The latexes of Examples 1–7 are tested to determine the effect of adding SAN latex. Latexes are subjected to coagulation, syneresis, dewatering and drying to recover a crumb which was then converted to pellet form by extrusion. The pellets were then dry blended with SAN copolymer pellets recovered from SAN latex made as set forth above under "Preparation of Latex" to 21% rubber and then injection molded without further compounding into test specimens. The test specimens were ground and extruded under identical conditions into thin tapes about 0.005 inches in thickness and the visible protrusion (nodes) were counted.

| Latex | % Gel | % Rubber | Visible Nodes/ Gram of Tape |
|---|---|---|---|
| Run ADG 9545 Latex | 89 | 54 | 5451 |
| with SAN added | 78 | 47 | 2971 |
| with SAN added | 71 | 43 | 1517 |

The addition of SAN latex in accordance with the present invention is seen to produce a product with a substantial improved dispersion as indicated by the reduction in visible nodes. This is accomplished with the complete elimination of the high shear dispersive mixing normally found in a compounding step.

EXAMPLE 9

Latex is made in a manner similar to Run ADG 9571 of Examples 1–7 except the rubber content is 50.4%. The latex is blended with SAN latex made as set forth above under "Preparation of Latex". A series of blends is then prepared using the techniques of Example 8 with the following results:

| % Rubber | Gloss(1) | % Elongation | IZOD Impact Strength(1) | Visible Nodes/gm |
|---|---|---|---|---|
| 50.4 | 92% | 38.2 | 5.7 | 5500 |
| 45.5 | 94% | 41.2 | 6.1 | 3000 |
| 40.6 | 93% | 35.2 | 6.3 | 1500 |

-continued

| % Rubber | Gloss(1) | % Elongation | IZOD Impact Strength(1) | Visible Nodes/gm |
|---|---|---|---|---|
| 35.7 | 92% | 46.3 | 5.8 | 2000 |
| 30.8 | 92% | 55.1 | 6.2 | 880 |
| 20.0 | 92% | 75.3 | 6.8 | 570 |

(1)of original injection molded specimens.

The addition of SAN latex in accordance with the present invention is found to improve the elongation properties, IZOD impact strength and visible appearance of subsequent extrusions.

EXAMPLE 10

A SAN latex produced as set forth above under "Preparation of SAN Latex" except additional soap is added so that the volume mean diameter is reduced to 850 Å when this latex is used in accordance with Example 8, the following is observed.

| Latex | % Gel | % Rubber | Visible Nodes/ Gram of Tape |
|---|---|---|---|
| Run ADG 9545 Latex | 89 | 54 | 5451 |
| with SAN added | 78 | 47 | 2125 |
| with SAN added | 71 | 43 | 1185 |

EXAMPLE 11

A latex is produced as set forth above under "Preparation of SAN Latex" except the amount of normal octyl mercaptan is increased from 2.7 lbs. to 5.4 lbs. When the latex is used in accordance with Example 1, Run ADG 9545, it is found that comparable results are obtained at a slightly reduced syneresis temperature.

What is claimed is:

1. A process for recovering solids from a first latex comprising a grafted polymer having a rubber substrate and a glassy superstrate, said polymer comprising greater than about 50% rubber substrate, said process comprising the steps of:
   (A) adding a second latex consists essentially of said superstrate to said first latex to form a blend of said first and second latexes said second latex being added in an amount effective to promote syneresis:

(B) coagulating said blend with high shear to form a paste;

(C) heating said paste to cause syneresis of said paste into polymeric particles; and (D) dewatering said particles.

2. The process of claim 1 wherein said first latex comprises a grafted polymer having a substrate containing a diene moiety and a superstrate of an interpolymer comprising a monovinyl aromatic hydrocarbon and an ethylenically unsaturated nitrile and wherein said second latex also consists essentially of the superstrate of an interpolymer of a monovinyl aromatic hydrocarbon and an ethylenically unsaturated nitrile.

3. The process of claim 1 wherein step (D) is carried out by mechanically dewatering said particles.

4. The process of claim 1 wherein said first latex is unfinishable and said second latex is added in an amount effective to provide finishability to a mixture of said first and second latexes.

5. The process of claim 1 wherein said grafted polymer comprises an acrylonitrile-butadiene-styrene polymer.

6. The process of claim 1 wherein said superstrate of said second latex consists essentially of a styrene-acrylonitrile copolymer.

7. The process of claim 2 wherein step (D) is carried out by mechanically dewatering said particles.

8. The process of claim 7 wherein said first latex is unfinishable and said second latex is added in an amount effective to provide finishability to a mixture of said first and second latexes.

9. The process of claim 8 wherein said grafted polymer comprises acrylonitrile-butadiene-styrene polymer.

10. The process of claim 9 wherein said superstrate of said second latex consists essentially of a styrene-acrylonitrile copolymer.

11. A process for recovering solids from an unfinishable latex of acrylonitrile-butadiene-styrene graft polymer, said graft polymer comprising greater than about 50% butadiene, said process comprising the steps of:

(A) adding an emulsion of a copolymer of acrylonitrile and styrene to said latex in an amount effective to promote syneresis;

(B) coagulating the product of step (a) with high shear to form a paste;

(C) subjecting said paste to syneresis to form a crumb; and (D) mechanically dewatering said crumb.

12. A product made in accordance with the process of claim 1.

13. A product made in accordance with the process of claim 11.

14. A formed product from a product made in accordance with the process of claim 1, then dry blended and thermoformed into a useful formed article without intermediate compounding.

* * * * *